United States Patent [19]

Giles et al.

[11] Patent Number: 4,462,205

[45] Date of Patent: Jul. 31, 1984

[54] INTEGRATED COAL-FIRED GAS TURBINE POWER PLANT

[75] Inventors: Walter B. Giles, Scotia; Norman J. Lipstein, Schenectady, both of N.Y.

[73] Assignee: General Electric Company, Schenectady, N.Y.

[21] Appl. No.: 276,434

[22] Filed: Jun. 22, 1981

Related U.S. Application Data

[63] Continuation of Ser. No. 69,775, Aug. 27, 1979.

[51] Int. Cl.³ ............................................. F02C 3/26
[52] U.S. Cl. ............................... 60/39.02; 60/39.464; 60/726
[58] Field of Search ............ 60/39.02, 39.12, 39.46 S, 60/39.51 R, 726; 417/150; 415/115

[56] References Cited

U.S. PATENT DOCUMENTS

| 2,625,791 | 1/1953 | Yellott | 60/39.46 S |
|---|---|---|---|
| 2,718,754 | 9/1955 | Lewis et al. | 60/39.46 S |
| 2,861,737 | 11/1958 | Bowen | 417/150 |
| 3,150,943 | 9/1964 | Darrow et al. | 55/261 |
| 3,832,090 | 8/1974 | Matto | 415/115 |
| 4,255,926 | 3/1981 | Heyn et al. | 60/39.12 |

FOREIGN PATENT DOCUMENTS

| 959869 | 3/1957 | Fed. Rep. of Germany . |
| 1081853 | 12/1954 | France . |

OTHER PUBLICATIONS

"Study of Advanced Energy Conversion Techniques for Utility Applications Using Coal or Coal Derived Fuels," Prepared for NASA Lewis Research Center in Response to Request for Proposal No. 3-499773-Q by the General Electric Company, Schenectady, New York, Jun. 24, 1974, Cover page, pp. 1-1 through 1-11, 2-5 through 2-10, 4-10 and 4-11.

H. E. Gerlaugh et al., "Cogeneration Technology Alternatives Study (CTAS)", General Electric Co., Final Report, vol. II–Analytic Approach, Prepared for NASA Lewis Research Center under Contract DEN 3-31 May, 1980, Cover page, pp. iii and iv, 1-1 through 1-6, 2-1 through 2-6, 3-1 through 3-5.

Leroy E. Schulze, "Hydraulic Air Compressors", U.S. Dept. of the Interior, Bureau of Mines Information Circular No. 7683, May 1954.

S. Moskowitz & G. Weth, "Design of a Pressurized Fluid Bed Coal Fired Combined Cycle Electric Power Generation Plant", presented at the Gas Turbine Conf. & Products Show, London, England, Apr. 9-13, 1978.

"Study of Advanced Energy Conversion Techniques for Utility Application Using Coal or Coal Derived Fuels", Summary Presentation of Results of Task I at NASA Lewis Research Center, Cleveland, Ohio, under Contract No. NAS3-19406, submitted by Corporate Research & Development, of General Electric Company, Schenectady, New York, dated May 27, 1975.

J. R. Corman & G. R. Fox, "Energy Conversion Alternatives Study (ECAS)", General Electric Phase II Final Report: vol. I, Executive Summary, under Contract No. NAS 3-19406, Report Date: Dec., 1976, Cover page, pp. iii, V, Vi-XViii, 1-3, 5-8, 24, 25, 28, 37.

Primary Examiner—Louis J. Casaregola
Attorney, Agent, or Firm—Robert J. Jarvis; James C. Davis, Jr.; Marvin Snyder

[57] ABSTRACT

An integrated coal-fired gas turbine power plant includes a hydraulic compressor for providing pressurized air to a coal combustion system and cooling air to the gas turbine.

4 Claims, 2 Drawing Figures

INTEGRATED COAL-FIRED GAS TURBINE POWER PLANT

This application is a continuation, of application Ser. No. 69,775, filed 8-27-79.

BACKGROUND OF THE INVENTION

This invention relates to an integrated coal-fired gas turbine power plant and more particularly to an integrated power plant employing a hydraulic compressor-gas turbine combined cycle.

Integrated coal-fired gas turbine power plants are well-known. A typical integrated plant includes a coal combustion system wherein a gaseous effluent is produced, an expansion turbine driven by the gaseous effluent, and a compressor which provides pressurized air useful in the coal-combustion system. Additionally, plants of this type may include secondary cycles wherein the waste heat contained in the exhaust of the gas turbine is utilized in a heat recovery steam generator to produce steam for driving a cooperating steam turbine electrical generator assembly. A plant of the foregoing type is described by Woodmansee in U.S. Pat. No. 4,150,953, assigned to the assignee hereof.

The present invention provides an improvement over these conventional power plant designs through the use of a hydraulic compressor with its attendant performance advantages in an integrated power plant. In addition to an increase in performance, the employment of a hydraulic compressor as described herein allows the beneficial elimination of the secondary steam cycle and of the mechanical compressor typical of conventional integrated plants of this type.

Heretofore, hydraulic compressors have been used primarily in air supply systems for mining operations, however their use in integrated power plants can provide several important advantages over the use of a mechanical compressor in a similar system. In particular, hydraulic compressors operate isothermally, thereby requiring significantly less work input than would the isentropic process of a mechanical compressor. For example, in an ideal process isothermal compression typically requires only 70.7% of the work input necessary to achieve a similar level of compression in an isentropic process when operating at typical large gas turbine pressure ratios (e.g. 10). Furthermore, the efficiency of an actual mechanical compressor is approximately 84% versus the efficiencies of approximately 85% for the hydraulic compressor and approximately 92% for an associated hydraulic pump. This results in a 24% net energy savings for a gas turbine-driven hydraulic pump/hydraulic compressor system, ($Wa_h$), as compared to a gas turbine-driven mechanical compressor system, ($Wa_m$), as seen from the following:

$$Wa_m \simeq \frac{1}{.84} Wa_{isentropic}$$

$$Wa_h \simeq \frac{1}{(.92)(.85)} Wa_{isothermal}$$

$Wa_{isothermal} \simeq 0.707 Wa_{isentropic}$ $\therefore Wa_h \simeq 0.76 Wa_m$ The isothermal process of the hydraulic compressor also provides a low temperature heat sink which can be used advantageously in conjunction with the waste heat contained in the exhaust of a gas turbine in an integrated power plant system. This waste heat is not normally added to the warm air (approx. 650° F.) exiting a conventional compressor since this would result in an efficiently large amount of heat remaining in the system exhaust stream. For example, in such a system gas exhausted from the turbine at 1000° F. might typically leave the system at 700° F. Thus, integrated plants of this type have typically employed costly steam bottoming cycles to recover more of this gas turbine waste heat. Additionally, these bottoming cycles have required a supply of heat from the cooperating combustion system to operate properly, resulting in a decreased heat supply for the gas turbine.

The relatively cool (approx. 100° F.) compressed air supplied by an isothermal hydraulic compressor allows for greater heat recapture from gas turbine exhaust resulting in system exhaust temperatures limited primarily by sulfuric acid formation in an associated regenerator at approx. 300° F. Thus, the need for a steam bottoming cycle is obviated. Consequently, the capital cost elements of the steam cycle and its heat transfer components are eliminated. Similarly, the high maintenance costs associated with a steam turbine cycle, as well as those associated with a mechanical compressor, are avoided since the mechanically simple hydraulic compressor system involves few moving parts. Moreover, the elimination of the steam turbine bottoming cycle through the practice of the present invention allows all of the heat energy available in a particular coal combustion system to be supplied to the resultant gaseous effluent rather than to a steam turbine as in conventional designs. (See, for example, "Commercial Power Plant Design Development for the Coal-Fired Combined Cycle", ASME Publication 77-JPGC-GT-6, by J. R. Petersen and V. H. Lucke.)

Finally, the availability of relatively low temperature compressed air resulting from the isothermal compression process of a hydraulic compressor system can be useful as described herein to remove many of the operating constraints imposed on gas turbine operations by the presence of coal-related contaminants. These contaminants are borne by the gaseous effluent entering a turbine from the coal combustion system of an integrated power plant. In particular, alkali metals such as sodium and potassium go into their vapor phase at the temperature levels typically experienced in a coal combustion system. These alkali contaminants can subsequently condense on portions of the turbine causing the affected turbine parts to corrode, resulting in a corresponding decrease in turbine life.

It is recognized that the rate of alkali corrosion attack is strongly temperature dependent on the operating temperature range of a gas turbine, with the rate of corrosion decreasing with decreasing temperature. Thus, by making the relatively low temperature compressed air from a hydraulic compressor available for turbine cooling, the metal temperature of affected turbine parts can be lowered to thereby decrease the rate of corrosion thereof to within acceptable limits. Furthermore, the relatively clean low-temperature compressed air provided by a hydraulic compressor can also be diverted to gaseous effluent cleanup systems contained in most coal combustion systems to act as a dilutent or to enable the condensaton of contaminants within the cleanup system. The gas turbine operating conditions are thus improved, as is the overall performance of the associated integrated power plant, through the employment of a hydraulic compressor.

Accordingly, an object of the present invention is to provide a new and improved integrated coal-fired power plant with improved cycle efficiency and decreased system maintenance costs.

Another object of the present invention is to reduce the cost and complexity of conventional integrated coal-fired power plants.

Another object of the present invention is to provide a new and improved integrated coal-fired power plant with reduced coal-contaminant induced constraints.

Another object of the present invention is to provide a new and improved integrated coal-fired power plant employing a hydraulic compressor/gas turbine combined cycle.

Still another object of the present invention is to provide a new and improved method for the utilization of coal in an integrated gas turbine power plant.

SUMMARY OF THE INVENTION

The above and other objects and advantages of the present invention are achieved in an integrated coal-fired power plant including a coal combustion system, an expansion turbine, and a means for producing pressurized air including a hydraulic compressor. A process for the utilization of coal is also disclosed wherein a gaseous effluent is produced in a coal combustion system supplied with pressurized air from a hydraulic compressor. The resulting gaseous effluent is directed to an expansion turbine to obtain useful energy output. Additionally, air from the hydraulic compressor is beneficially diverted for turbine cooling and for gaseous effluent cleanup purposes.

BRIEF DESCRIPTION OF THE DRAWING

For a better understanding of the invention reference may be had to the accompanying drawing wherein.

DESCRIPTION OF THE INVENTION

Figure 1:
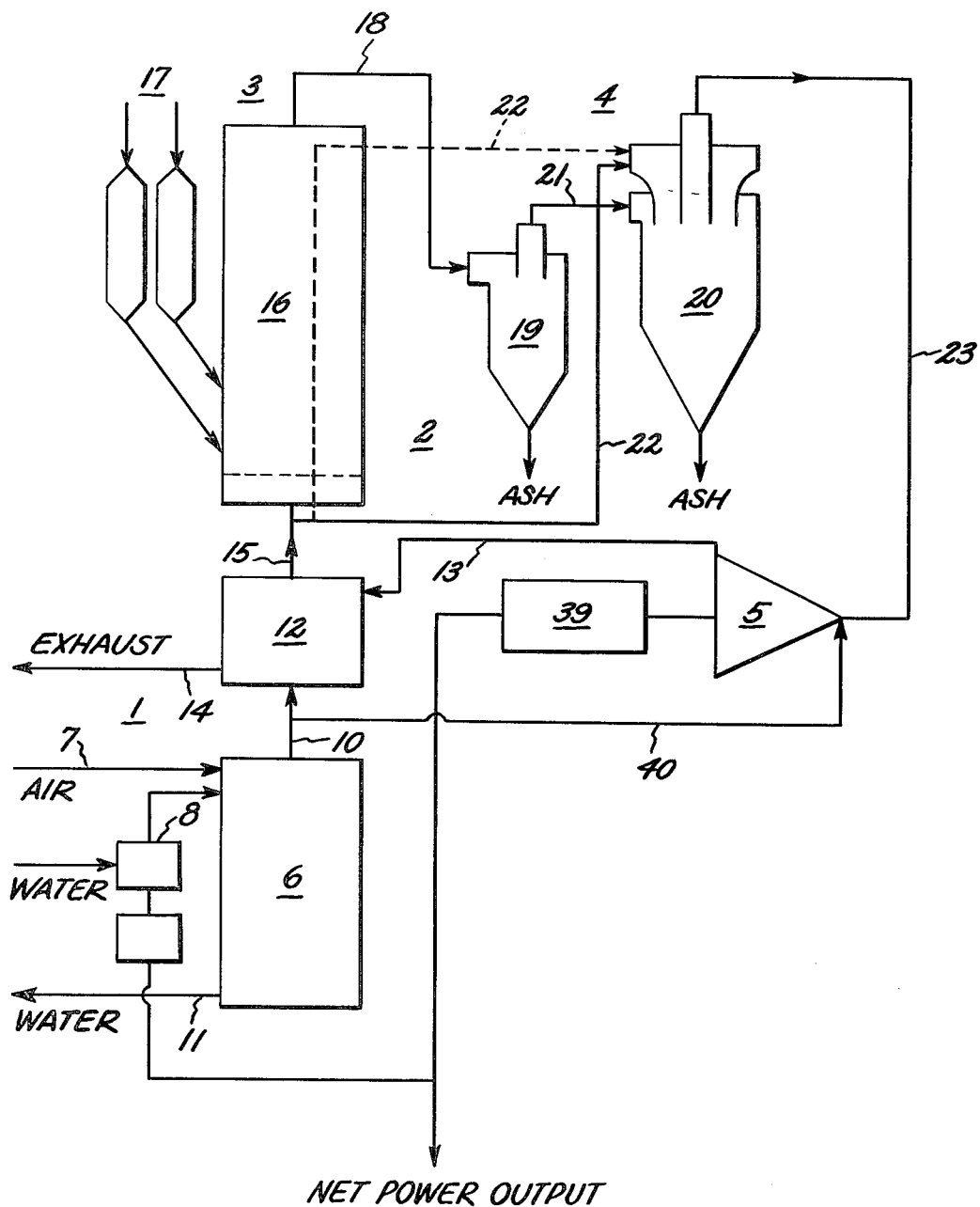
FIGS. 1 and 2 are schematic views illustrating alternative embodiments of the present invention.
Figure 2:
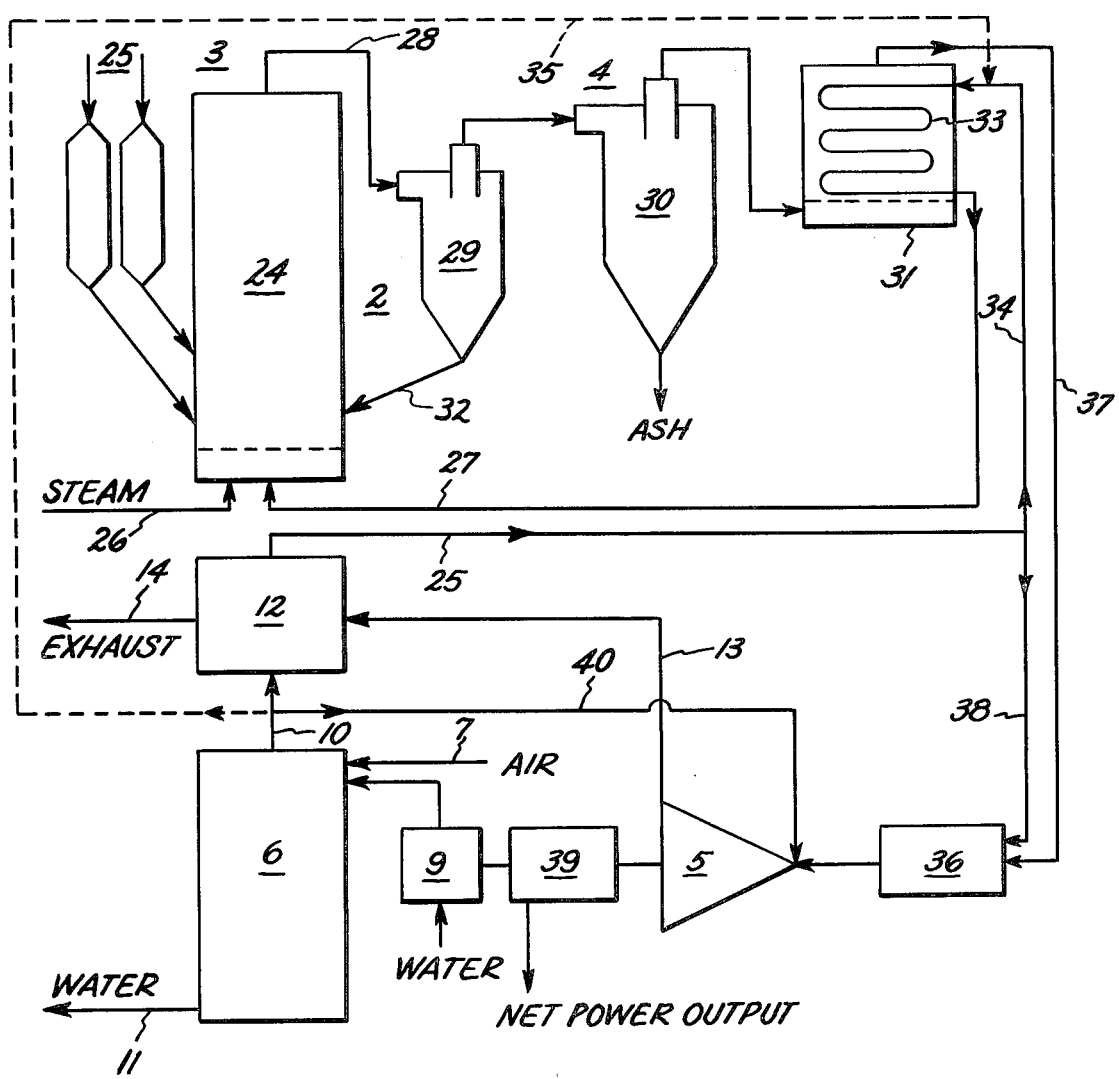

As depicted in FIGS. 1 and 2, the subject invention comprises a means 1 for providing pressurized air to a coal combustion system 2, which system includes a means 3 for producing a gaseous effluent in a coal combustion process and a gas cleanup segment 4 for the effluent so produced. The resultant effluent is then expanded in a gas turbine 5 to produce useful work.

A conventional hydraulic compressor 6 is employed in the means 1 to isothermally compress air which enters the hydraulic compressor through a conduit 7. As more fully described in "Hydraulic Air Compressors", Bureau of Mines Information Circular 7683 (May, 1954) for several typical hydraulic compressor systems, the air or an alternative gas to be compressed is absorbed through an aspirator into a down-flowing column of a fluid such as water and is compressed thereby. The fluid may be supplied to a point of sufficient height in the hydraulic compressor system by any of several methods, including through the use of a motor-driven pump 8 as in the embodiment of the invention depicted in FIG. 1, or through the use of a direct turbine-driven pump 9 as in the embodiment depicted in FIG. 2. In both embodiments the air and fluid are separated after compression, with the air being exhausted through a line 10, and the fluid through a different line 11.

A conventional regenerator 12 is included in the means 1 to efficiently recapture the otherwise wasted heat contained in the exhaust of the gas turbine without requiring the use of a costly secondary steam turbine cycle as has been typically done in the past. (See, for example, "Commercial Power Plant Design Development for the Coal-Fired Combined Cycle", ASME Publication 77-JPGC-GT-6, by J. R. Petersen and V. H. Lucke.) Cool compressed air entering the regenerator through a conduit 10 passes therethrough in heat exchange relationship with the relatively hot gas turbine exhaust entering the regenerator 12 through a conduit 13 and exiting therefrom through a conduit 14. Thusly heated in the regenerator 12, the compressed air passes to the coal combustion system 2 through a conduit 15. Sufficient air is supplied to the system 2 to assure that combustion system temperatures are maintained below the slagging temperature of ash by-products of the combustion process.

In the embodiment of the invention depicted in FIG. 1, the hot compressed air flowing into the coal combustion system 2 enters a pressurized fluidized bed (PFB) combustor 16 which is a portion of the means 3 for producing a gaseous effluent. The means 3 also includes a conventional feed system 17 for coal and dolomite used in the PFB combustor 16. The PFB combustor itself is of conventional design wherein the combustion of coal is achieved in a pressurized chamber which includes a fluidized bed of dolomite or limestone for the beneficial absorption of $SO_x$ and $NO_x$ emitted in the combustion process. However, in this system all of the heat energy is supplied to the gaseous effluent and none is transferred to a steam turbine as is typical of combined cycles, such as described in the Petersen and Lucke article supra. This feature significantly reduces the cost and complexity of the means 3, and is a major objective of this invention.

The resultant gaseous effluent is transferred from the means 3 to the gas cleanup segment 4 of the coal combustion system 2 through a conduit 18. In the embodiment of the invention depicted in FIG. 1, erosive particulate matter is removed from the gaseous effluent in a cleanup segment which includes a conventional cyclone separator 19 and an air-shield cyclone separator 20 similar to that disclosed in U.S. Pat. No. 4,212,653. In this embodiment the cyclone separator 19 removes a large portion of the detrimental particulates, while the air-shield cyclone 20 removes finer particulate matter. The air-shield cyclone separator 20 requires a clean gaseous input flow in addition to the gaseous effluent entering at 21 to function properly. In the subject invention this clean gaseous flow is supplied by the means 1 for providing pressurized air acting in cooperation with a conduit 22. The resultant cleaned gaseous effluent is then fed through a conduit 23 from the coal combustion system 2 to the expansion turbine 5. Provided that sufficiently corrosion resistant materials are employed, the conduit 22 may alternatively pass in heat exchange relationship through the combustor 16, to thereby achieve higher turbine inlet temperatures.

In the alternative embodiment of the invention depicted in FIG. 2 the coal combustion system 2 includes a pressurized fluidized bed (PFB) gasifier 24 in the means 3 for producing a gaseous effluent. The PFB gasifier 24 is of conventional design, capable of producing a low BTU gaseous effluent when supplied with coal and limestone from a suitable feed system 25, with adequate steam from an inlet 26, and with compressed air transferred through a conduit 27. The gaseous effluent exhausted from the PFB gasifier 24 through a conduit 28 is then passed through a gas cleanup segment 4 of the coal combustion system 2 which includes a char-recycle cyclone separator 29, a conventional cyclone separator 30 and an alkali scrubber system 31.

Coal particulates are removed from the gaseous effluent to the char-recycle cyclone separator 29 and are returned to the PFB gasifier 24 through a conduit 32. The gas then passes to a conventional cyclone separator 30 wherein further particulate separation is effected. After these initial cleanup stages the gas is then passed through an alkali scrubber system 31 for removal of corrosive alkalies in vapor form from the gaseous mixture through a condensation process. The alkali scrubber system also operates to remove additional fine particulates from the gas to thereby suppress the transmission of solid phase alkalies to a gas combustor 36. This is an essential feature to minimize the production of additional alkali vapor at the higher firing temperature of the combustor. This process of fine particulate removal may be further enhanced by the use of electrostatic forces. An alkali scrubber system of this type is described in copending patent application Ser. No. 17,613, filed Mar. 5, 1979 and assigned to the same assignee as the present invention.

Means 33 are provided for circulating necessary cooling air through the alkali scrubber system 31. As depicted in FIG. 2, the means 33 includes a conduit 34 connecting the outlet of the regenerator 12 to an inlet on the alkali scrubber system 31. It is to be understood, however, that cooling air might also be transferred to the inlet of the alkali scrubber system 31 from a point intermediate the hydraulic compressor 6 and the regenerator 12 through a conduit 35 to thereby provide a lower temperature cooling fluid for the scrubber system. After exiting the alkali scrubber system 31 the heated air is then conducted to the pressurized fluidized bed gasifier 24 through the conduit 27.

The coal combustion system 2 of the embodiment of the invention depicted in FIG. 2 also includes a gas combustor 36 as a portion of the means 3 for producing a gaseous effluent. Relatively clean gas flowing from the alkali scrubber system 31 through the conduit 37 is intermixed in the combustor 36 with a predetermined amount of compressed air which is advantageously preheated in the regenerator 12 and passes to the combustor through a conduit 38. A suitable gaseous combustion product is thus provided for use in the expansion turbine 5 which is in flow communication with the combustor 36.

In the embodiments depicted in both FIGS. 1 and 2 a rotor within the expansion turbine 5 rotates when provided with a flow of suitable expansible gas. An electrical generator 39 coupled with the turbine is thus caused to produce electrical power in a conventional manner. A cooling air conduit 40 delivers air from the hydraulic compressor 6 to the turbine 5 to effect a cooling of turbine parts exposed to the hot gaseous stream. In this manner, the metal temperature of these parts is sufficiently reduced to cause a decrease in the strongly temperature-dependent corrosive reaction of any alkali vapor which might remain in the gaseous stream.

Thus, there is provided a process for the utilization of coal in which air is compressed isothermally in a hydraulic compressor 6. A portion of this air is diverted to cool parts of an associated gas turbine, thereby to minimize the alkali corrosion thereof. A second portion of the compressed air is heated in a regenerator from a temperature below approximately 100° F. to a temperature of approximately 850° F. The heated air is then passed through a coal combustion system where a gaseous effluent is produced and cleaned prior to entering the gas expansion turbine where useful work output is obtained.

The above described embodiments of this invention are intended to be exemplary only and not limiting and it will be appreciated from the foregoing by those skilled in the art that many substitutions, alterations and changes may be made to the disclosed system and process without departing from the spirit or scope of the invention. In particular, it is understood that the coal combustion system employed in the subject invention can include any of a variety of available means for producing a gaseous effluent as well as any accompanying gas cleanup systems, provided that the output gas is suitable for use in an expansion turbine and the coal combustion system requires a source of pressurized air or other suitable fluid which can be produced in a hydraulic compressor.

What is claimed as new and desired to be secured by Letters Patent of the United States is:

1. An apparatus for the utilization of coal comprising:
    a coal combustion system including a pressurized fluidized bed combustor for producing a hot motive effluent;
    a gas cleanup segment in flow communication with said pressurized fluidized bed combustor, said cleanup segment receiving said motive effluent;
    an expansion turbine receiving said motive effluent from said gas cleanup segment;
    means for substantially isothermally producing pressurized fluid in flow communication with said coal combustion system, including a hydraulic compressor and a regenerator connected intermediate said hydraulic compressor and said coal combustion system, said regenerator being in heat exchange relationship with the exhaust of said expansion turbine; and
    means for supplying a flow of fluid from said pressurized fluid producing means to said gas cleanup segment, said flow supplying means passing in heat exchange relationship through a segment of said coal combustion system to absorb heat prior to reaching said gas cleanup segment.

2. The apparatus of claim 1 wherein said gas cleanup segment comprises an air shield cyclone separator having a first inlet means for receiving said flow of fluid from said pressurized fluid producing means and a second inlet means for receiving said motive effluent from said coal combustion system.

3. A process for the utilization of coal that comprises:
    substantially isothermally producing compressed gas in a hydraulic compressor;
    passing at least a portion of the compressed gas from the hydraulic compressor through a regenerator;
    introducing the compressed gas that passes through the regenerator into a coal combustion system comprising a pressurized fluidized bed combustor for inter-reaction with coal contained in said combustor;
    producing a gaseous effluent in the coal combustion system;
    passing the gaseous effluent from the coal combustion system through a gas cleanup segment;

diverting a portion of the compressed gas from the hydraulic compressor to the gas cleanup segment, by passing said portion of the compressed gas in heat exchange relationship through a segment of the coal combustion system to absorb heat prior to being diverted to the gas cleanup segment;

introducing the gaseous effluent that passes through the gas cleanup segment to an expansion turbine and expanding said effluent therein so that the turbine is driven to provide useful work; and removing the expanded gaseous effluent from the turbine and passing it in heat exchange relationship with the compressed gas passing through the regenerator.

4. The process for the utilization of coal as in claim 3 wherein said steps of passing the gaseous effluent through a gas cleanup segment and of diverting a portion of the compressed gas to the gas cleanup segment comprise passing the gaseous effluent through a first inlet means of an air shield cyclone separator, for receiving said gaseous effluent, and diverting said portion of the compressed gas to a second inlet means of the separator, for receiving said portion of the compressed gas.

* * * * *

UNITED STATES PATENT AND TRADEMARK OFFICE
CERTIFICATE OF CORRECTION

PATENT NO. : 4,462,205

DATED : July 31, 1984

INVENTOR(S) : Walter B. Giles and Norman J. Lipstein

It is certified that error appears in the above-identified patent and that said Letters Patent is hereby corrected as shown below:

Column 2, lines 3 and 4, delete "efficiently" and substitute therefor --inefficiently--.

Signed and Sealed this

Nineteenth Day of February 1985

[SEAL]

Attest:

DONALD J. QUIGG

Attesting Officer — Acting Commissioner of Patents and Trademarks